Sept. 10, 1968                    R. C. FISCHER                    3,400,840
                          AUTOMATIC BALE LOADING MACHINE
Filed May 12, 1967                                              4 Sheets-Sheet 1
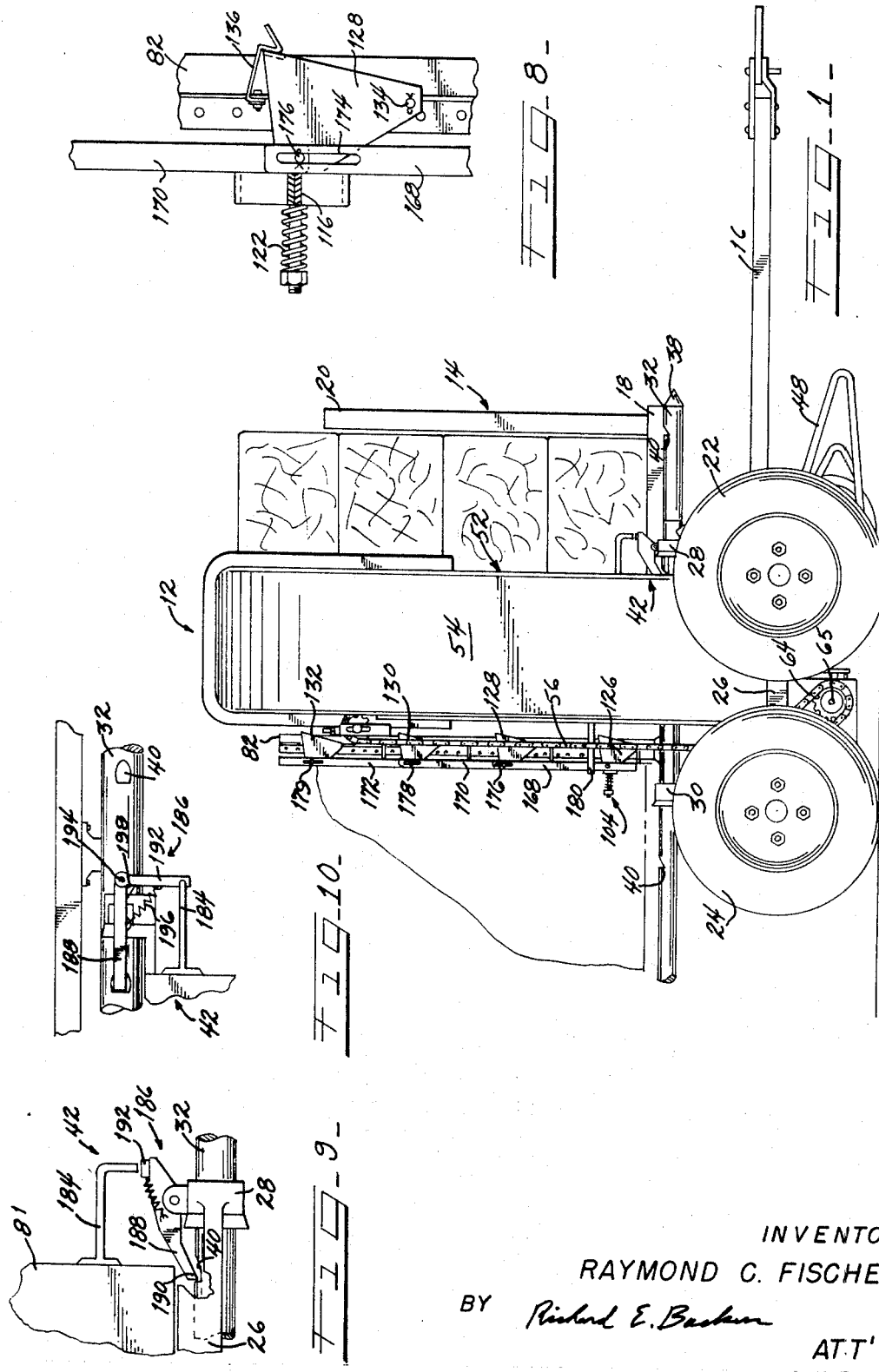
INVENTOR
RAYMOND C. FISCHER
BY Richard E. Backer
                    ATT'Y.

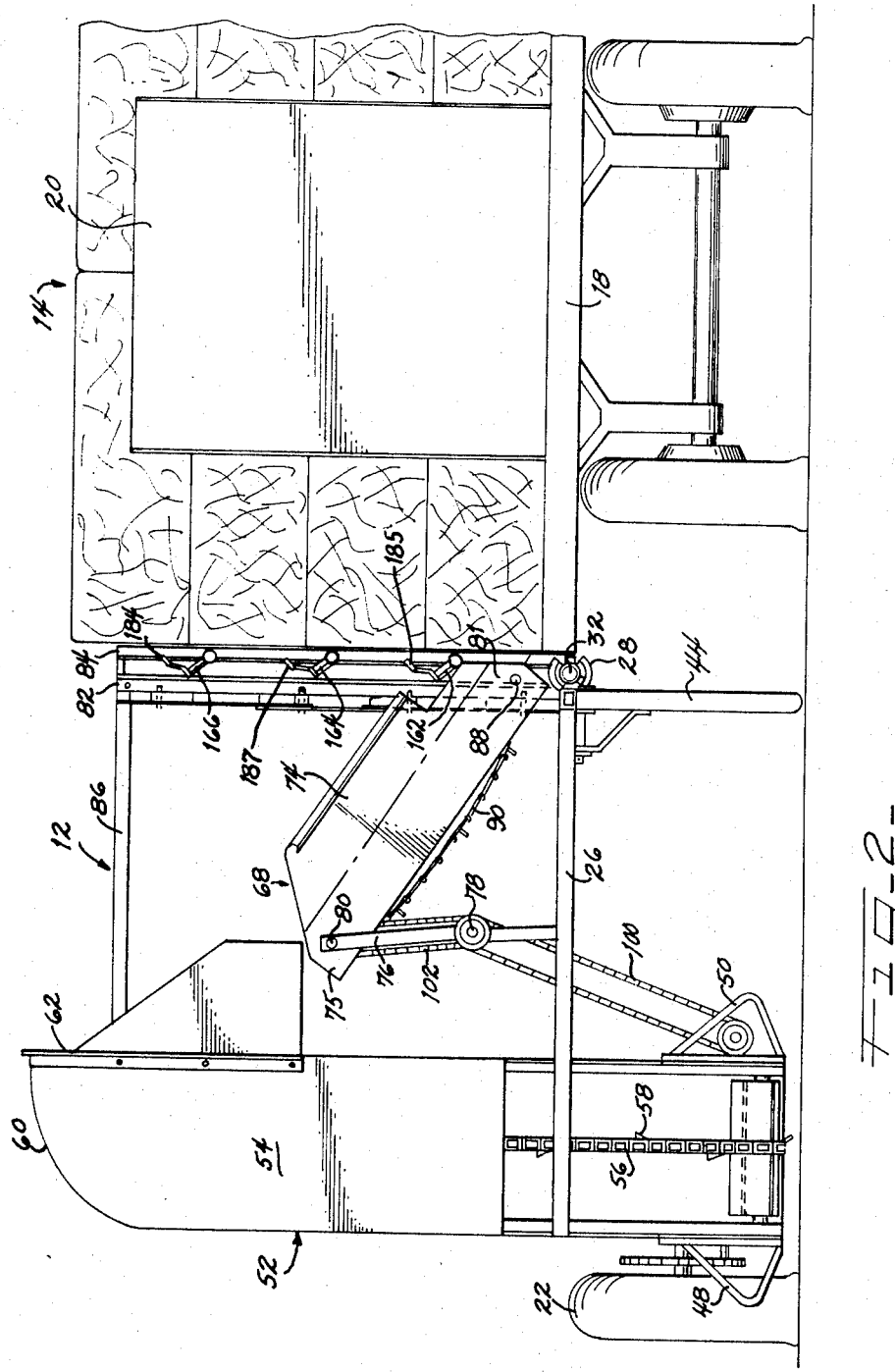

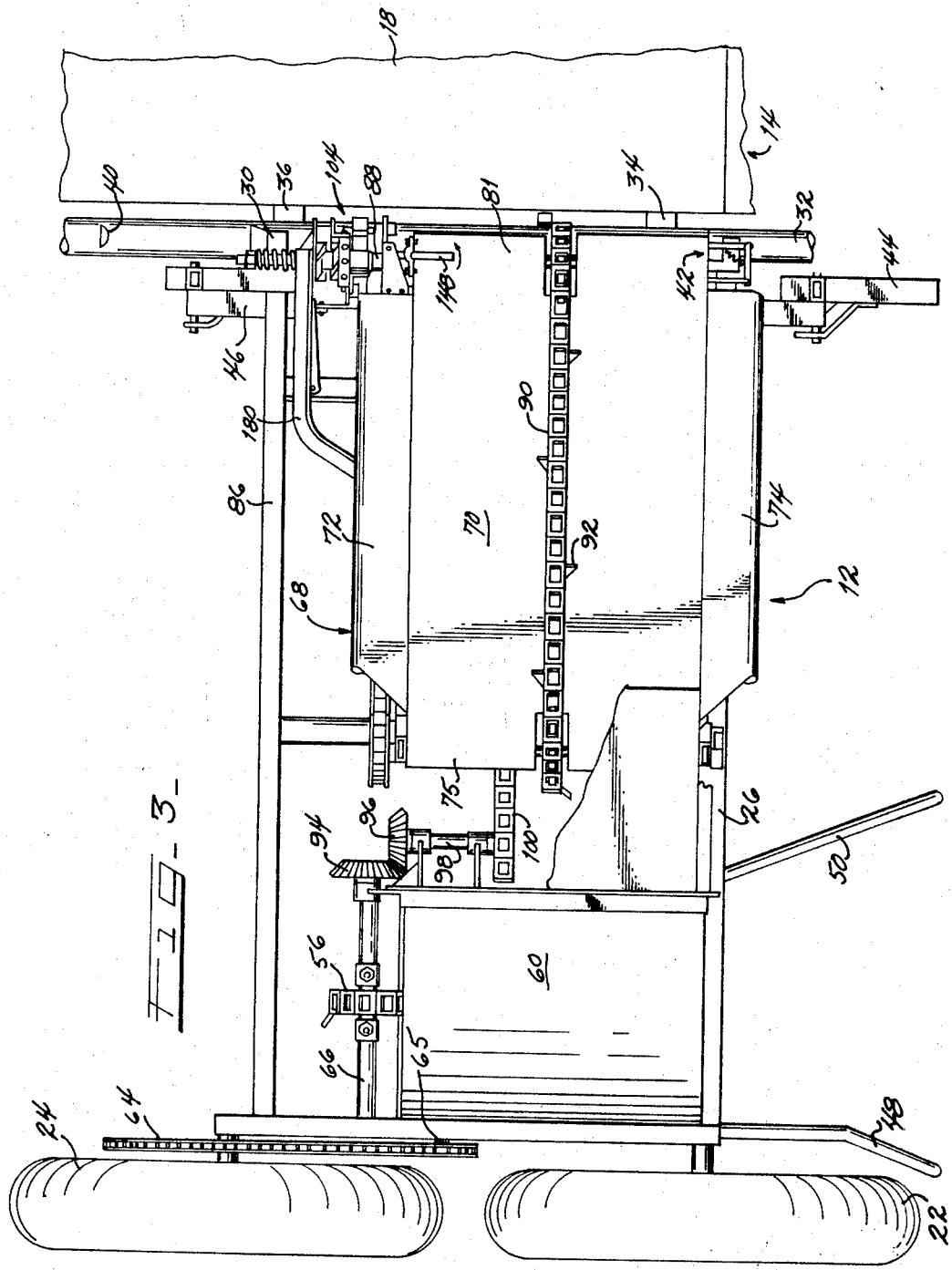

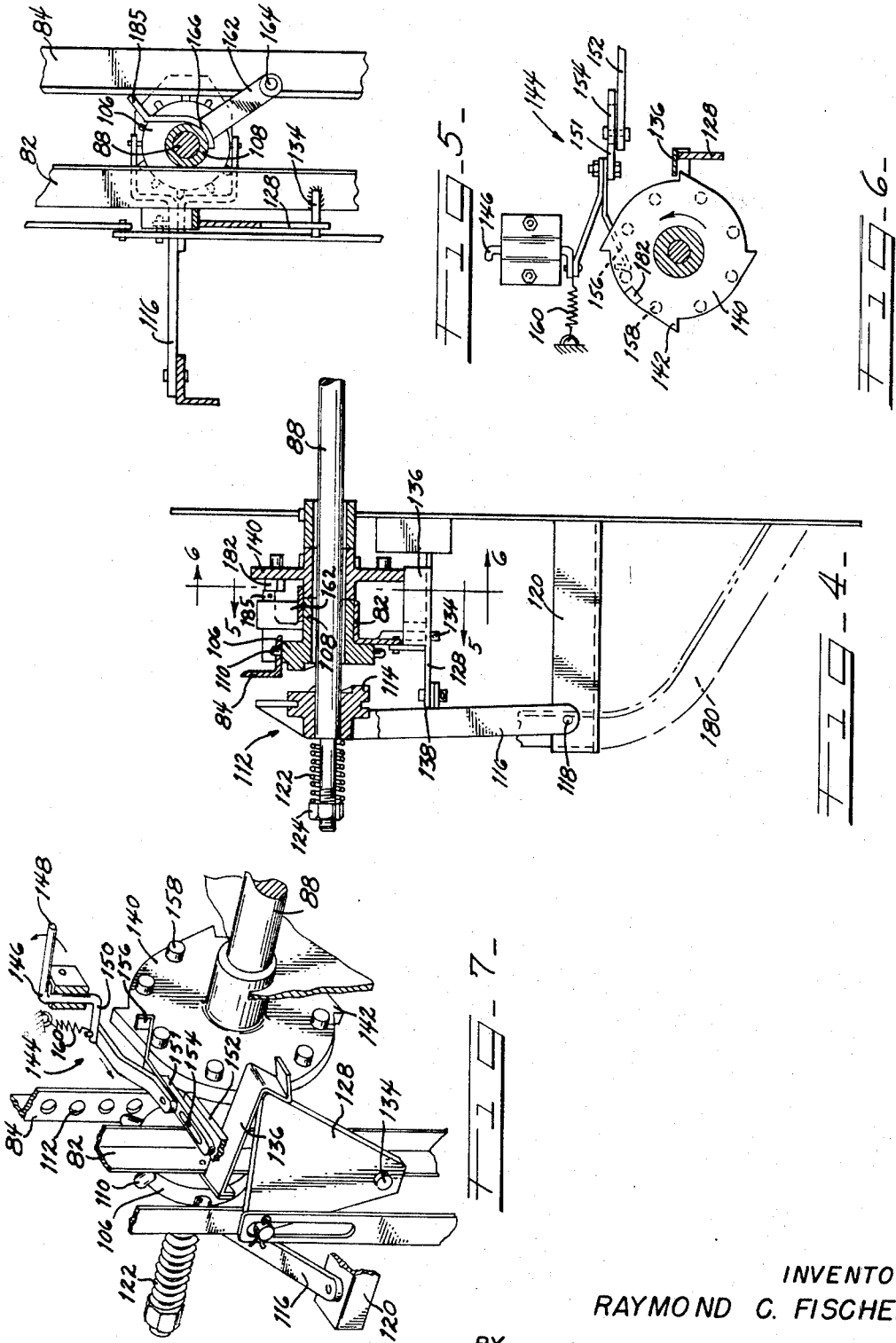

United States Patent Office 3,400,840
Patented Sept. 10, 1968

3,400,840
AUTOMATIC BALE LOADING MACHINE
Raymond C. Fischer, Hinsdale, Ill., assignor to International Harvester Company, Chicago, Ill., a corporation of Delaware
Filed May 12, 1967, Ser. No. 638,124
10 Claims. (Cl. 214—6)

ABSTRACT OF THE DISCLOSURE

An automatic bale loading machine attachable to a bale carrying wagon with an elevator to pick up and lift the bales and a transverse conveyor to distribute the bales onto the wagon at successive levels for a series of tiers. A vertical indexing mechanism responsive to the number of bales loaded operates to position the end of the conveyor at each level on the wagon for bale delivery while a longitudinal indexing mechanism operates so that the machine moves rearwardly to successive tiers until the wagon is completely loaded.

Summary of the invention

This invention relates to machinery for loading bales of material, such as hay bales, onto a wagon or other bale carrying vehicle. The invention provides a machine which is easily attached and detached to existing wagons which require only a minimum amount of modification for this purpose. The bale loading machine of this invention is automatic in operation, simple in construction, and is relatively small and lightweight. The machine is ground-driven and thus does not require any power take-off connection from a tractor or other power source. The machine is thus lower in cost as compared to self-propelled bale loaders and also is relatively simple to maintain.

An example of a complicated design for a bale loader is that shown in the patent to Gray No. 2,848,127. In the Gray design the bale stacking mechanism is integral with the bale carrying trailer itself. The trailer must be unloaded before resuming a bale loading operation with the machine. In applicant's invention, on the other hand, the loading machine is automatically detached from the loaded bale wagon, thus enabling another wagon to be attached so that loading may continue while the first wagon is being unloaded.

Description of the drawings

FIGURE 1 is a side elevation view of an automatic bale loading machine constructed according to the present invention;

FIGURE 2 is a front elevation view of the loading machine of FIGURE 1 illustrating the attachment thereof to a bale carrying wagon;

FIGURE 3 is a top plan view of the loading machine with a portion thereof cut away for clarity;

FIGURE 4 is a top plan view, partially in cross section, of the vertical indexing mechanism for the loading machine;

FIGURE 5 is a front elevation sectional view of the indexing mechanism taken along the line 5—5 of FIGURE 4;

FIGURE 6 is a rear elevation sectional view of the indexing mechanism taken along the line 6—6 of FIGURE 4;

FIGURE 7 is a perspective view of the indexing mechanism of FIGURE 4;

FIGURE 8 is a side elevation view of a portion of the indexing mechanism of FIGURE 4;

FIGURE 9 is a side elevation view, partially cut away, of the longitudinal indexing mechanism for the loader machine; and FIGURE 10 is a top plan view of the indexing mechanism of FIGURE 9.

Description of the preferred embodiment

Referring now to the drawings the automatic bale loading machine of the present invention is designated generally by the numeral 12. As best shown in FIGURE 2, loading machine 12 is adapted for attachment to the side of a bale carrying wagon 14. The wagon 14 is largely conventional and is attachable by means of tongue 16 to a tractor which will pull both the wagon and loading machine through a field. Wagon 14 is provided with a flat bed 18 permitting the bales to be laterally pushed across the top surface of the bed by means of the loading machine. The wagon is open on the side adjacent the loading machine and is enclosed on the remaining three sides by suitable walls 20.

Loading machine 12 is supported outwardly of the wagon by means of a pair of tandem wheels 22 and 24 mounted on loader frame 26. The inboard side of the loader machine is releasably attached to the wagon by means of a pair of annular, longitudinally spaced sockets 28 and 30 secured to frame 26. These sockets are slidably carried on a longitudinally extending pipe 32 secured to the side of bed 18 by means of brackets 34 and 36.

Attachment of loader 12 onto the side of wagon 14 is effected by moving the wagon forward so that pipe 32 is inserted into the sockets 28 and 30. Each of the sockets is slotted adjacent the bed side to permit clearance for the brackets 34 and 36. The rear end of each socket is flared to facilitate engagement with a cone 38 provided on the forward end of the pipe. A series of notches 40 are formed at spaced intervals along the pipe at substantially one bale width distance apart. A longitudinal indexing mechanism 42 is mounted on loader 12 and functions to serially engage the notches 40 to releasably hold the loader to the pipe while the bales are loaded onto successive tiers. The construction and operation of the indexing mechanism 42 is explained in greater detail herein in connection with FIGURES 9 and 10.

A pair of foldable legs 44 and 46 are mounted on the inboard side of loader frame 26. These legs function to support the loader in an upright position after the wagon has been disengaged therefrom. The legs may be spring loaded in the downwardly extending position so that they will readily fold upwardly when they strike undulating ground during forward travel of the loader.

With the loader secured to the side of the wagon adjacent the first tier a tractor (not shown) will pull the combination through a field to pick up and load the bales in a fully automatic operation. Forwardly extending guide bars 48 and 50 secured to loader frame 26 function to align the bales with elevator 52 as the loader is moved forwardly along a row of bales.

Elevator 52 comprises a housing 54 enclosing an upwardly extending endless chain 56. The chain 56 is provided with a plurality of projecting links 58 which, as the chain moves upwardly at the front end, tilt the bale on end and move it upwardly into housing 54. The housing holds the bale against the chain so that the bale is moved upwardly against curved end 60 of the housing, which deflects the bale laterally through discharge opening 62. Elevator chain 56 is ground-driven from rear wheel 24 by means of drive chain 64, idler shaft 65, an intermediate gear set (not shown), and drive shaft 66 (FIGURE 3).

As the bale is discharged from the elevator it is directed onto conveyor 68 which moves the bale transversely onto the wagon bed. Conveyor 68 comprises bottom surface 70 enclosed by side walls 72 and 74 to form a channel directing each bale onto the wagon. The receiving end 75 of the conveyor is supported on frame 26 by means of a pair of arms 76, each arm being pivotally mounted at its lower end to frame 26 by means of shaft 78 and at its upper end to the conveyor by means of pin 80. The discharge end 81 of the conveyor is supported on the loader frame for vertical sliding movement by means of a pair of guide angles 82 and 84 affixed at their lower ends to frame 26 and at their upper ends to brace member 86 on the loader. Final shaft 88 on the conveyor discharge end is mounted between the guide angles in a manner to be presently described. As discharge end 81 is elevated arms 76 will pivot outwardly.

Conveyor 68 further comprises a conveyor chain 90 having a plurality of projections 92 affixed thereto to move the bale laterally. The conveyor is ground-driven by means of a drive train connected with elevator drive shaft 66. A bevel gear 94 on shaft 66 drives bevel gear 96, shaft 98, drive chain 100, and drive chain 102 which in turn drives the conveyor.

The conveyor initially will move the first bale onto the near side of the bed on the lower level of the first tier. The conveyor will then push the second bale against the first bale so that the latter is moved across the bed into contact with the side wall on the opposite side of the wagon. Indexing mechanism 104 is provided at the rear side of the conveyor to elevate discharge end 81 through the distance of one bale height to the next higher level where the conveyor will move two additional bales onto the wagon. The compacted bales have sufficiently smooth surfaces to slide over the top of the underlying bales. Indexing mechanism 104 operates responsive to the number of bales which the conveyor moves onto the wagon, which in the preferred embodiment consists of two bales in each level with four levels in each tier.

Indexing mechanism 104 is shown in greater detail in FIGURES 4 through 8. The conveyor discharge end is intermittently powered upwardly by means of conveyor final shaft 88 which is continuously driven as long as the loader is in forward motion. A sprocket-like wheel 106 having peripheral teeth 110 is rotatably mounted on shaft 88 between the two guide angles 82 and 84. Hub 108 is in rolling contact with the inner surface of guide angle 82 while the plurality of teeth 110 engage a rack defined by apertures 112 formed in guide angle 84.

A jaw clutch 112 is provided to engage and disengage shaft 88 with sprocket wheel 106 as required. Clutch 112 comprises jaw plate 114 keyed to shaft 88, clutch throw-out arm 116 pivotally attached at 118 to support 120, and compression spring 122 which forces jaw plate 114 into engagement with a corresponding jaw surface on sprocket wheel 106. Spring 122 is secured on the end of shaft 88 by suitable means such as nut 124.

Clutch 112 is operated by means of a series of cams 126, 128, 130, and 132 (FIGURE 1). Each of the cams is positioned at a respective level where it will stop the conveyor discharge end for receiving two bales and then operate clutch 112 so that the discharge end moves upward to the next level. With the clutch engaged shaft 88 will turn sprocket wheel 106 clockwise, as viewed in FIGURE 5, to climb up guide angle 84. This carries both discharge end 81 and indexing mechanism 104 upward between the guide angles.

Cam 128 for the second level is representative of the cams 126, 130 and is illustrated in FIGURES 4 through 8. The cam is pivoted to guide angle 82 by means of pin 134. For disengagement of clutch 112 cam 128 is held in the upright position shown in FIGURE 7 by means of flat retaining spring 136 attached to guide angle 82. In this position edge 138 of the cam bears against throw-out arm 116, holding it outwardly so that clutch 112 is disengaged. Cam 132 is rigidly attached to angle 82 at the top level since there is no requirement for moving the conveyor end any higher. Cam 132 disengages the clutch in a manner similar to that described for cam 128.

For engagement of clutch 112 an indexing wheel 140 is provided to release the retaining springs from the cams as required. When this occurs each cam is free to pivot forward through the action of clutch spring 122 which moves jaw plate 114 into engagement with wheel 106 while simultaneously pivoting arm 116 forward.

Indexing wheel 140 is rotatably mounted on shaft 88 independently of sprocket wheel 106. The indexing wheel is provided with a number of peripheral lugs 142 corresponding to the number of levels in each tier, which in the preferred embodiment is four. As illustrated in FIGURE 6 the lugs are positioned so that after each one-quarter rotation of wheel 140 they will move flat spring 136 upwardly to release the cams.

Indexing wheel 140 is rotated by means of a ratchet device 144 operating responsive to bale movement through the discharge end of the conveyor. The ratchet device comprises a lever 146 having an arm 148 projecting outwardly into the path of bale movement. As illustrated in FIGURES 3 and 7 the arm 148 will pivot outwardly as it is contacted by the bale during discharge onto the bed. This action pivots inwardly lever arm 150 which in turn slides inwardly carrier member 151 which is free to move relative to conveyor frame 152 at the lost-motion connection 154. A flat ratchet spring or pawl 156 is affixed to the carrier in alignment with a plurality of ratchet teeth 158 provided on the indexing wheel. The number of teeth is equal to the number of bales which form a tier, which in the preferred embodiment is eight. After the bale clears the discharge end and releases lever 146 a tension spring 160 returns carrier 150 and lever 146 to their original positions. At the same time the end of ratchet spring 156 engages one of the ratchet teeth 158 to move wheel 140 through one-eighth revolution. Thus, movement of two bales through the conveyor will move the indexing wheel through one-quarter revolution to release the cam and engage clutch 112 to power the conveyor end up to the next level.

At the second level cam 128 will be in the set position as illustrated in FIGURE 8. As indexing mechanism 104 approaches this level during upward movement from the first level the outer edge of the cam will bear against throw-out arm 116, moving it outwardly against the force of spring 122 to disengage clutch 112. With the drive between final shaft 88 and sprocket wheel 106 interrupted the conveyor discharge end will commence to fall downwards. However, a stop arm 162, which is pivotally connected to guide angle 84 by means of pin 164, will pivot into the path of sprocket wheel hub 108, thus holding the entire conveyor end at the second level. As shown in FIGURE 2 similar stop arms 164 and 166 are provided at the third and fourth levels. During upward travel of the conveyor end the stop arms will pivot outwardly permitting hub 108 to clear arcuate support 166 on the stop.

Each of the cams are reset upon engagement of the clutch when the conveyor end is in the level above the cam being reset. This is accomplished by means of interconnecting the cams with a series of three straps 168, 170, and 172 (FIGURE 1). These straps are each provided at one end with an elongated slot 174 which is slidably carried by a respective pin 176, 178, or 179 secured to the upper end of the respective cams. This connection for the second level is shown in FIGURE 8.

Resetting of the lower cam 126 will now be described. Assuming that ratchet device 144 has moved indexing wheel 140 sufficiently to release spring 136 from the cam, clutch spring 122 will pivot throw-out arm 116 forward as clutch 112 is engaged. Arm 116 will bear against the edge of cam 126, pivoting it to the right. Strap 168 will also pivot about its upper end on pin 176 until the lower end contacts pin 134 on cam 126. Following this the conveyor end will climb to the second level where it will remain until two more bales have been loaded onto the wagon. At this time the indexing mechanism again will operate to release cam 128, engage clutch 112, and propel the conveyor end up to the third level. As this occurs spring 122 and arm 116 operate to pivot cam 128 forward until the leading edge of strap 168 contacts pin 134 (FIGURE 8). The force from the spring is sufficient to rotate strap 168 about pin 178 so that the lower end of the strap is moved rearwardly. This in turn pivots cam 126 on the first level rearward until retaining spring 136 catches the edge of the cam.

Cam 128 is reset in a manner similar to that described above for cam 126. Cam 130 at the third level is reset when a projecting arm 180 attached to the end of the conveyor (FIGURE 3) contacts the upper end of strap 172 when the conveyor end approaches its uppermost position. This pivots strap 172 clockwise about pin 179 to reset cam 130. There is no requirement to reset cam 132 as it is fixedly attached to angle 82 to hold the clutch disengaged since there is no need to raise the conveyor higher. At this time all of the came are relatched and the straps 168, 170, and 172 present a continuous barrier against throw-out arm 116 to prevent engagement of clutch 112 as the conveyor end drops downward to the first level.

The operation of the loader machine to return the conveyor end to the first level will now be described. When the eighth and last bale leaves the conveyor, ratchet device 144 will operate as described to rotate indexing wheel 140 through its final one-eighth turn. This moves a projection 182 (FIGURES 4 and 6) provided on the indexing wheel into engagement with a camming surface 184 (FIGURE 2) provided on stop 166. Camming surface 184 is similar in construction to that of surface 185 for arm 162 shown in FIGURE 5. This camming action of projection 182 will pivot stop 166 out from under hub 108, thus permitting the conveyor end to drop. As the conveyor end reaches successive levels projection 182 will function in the above manner to pivot the respective stops having camming surfaces 187 and 185 and permit the conveyor end to return to the first level.

As the conveyor end approaches the first level longitudinal indexing mechanism 42 will now operate to permit loader 12 to move rearwardly to the next tier where eight additional bales will be loaded onto the wagon. Indexing mechanism 42 is illustrated in FIGURES 9 and 10 and comprises an outwardly and downwardly extending arm 184 secured to the forward side of the conveyor end. The end of this arm is in registry with a detent mechanism 186 which releasably engages pipe 32 on the wagon. Detent mechanism 186 comprises a lever 188 pivoted to the upper side of socket 28. The lever has an end 190 adapted to releasably engage the notches 40 provided in pipe 32. The forward end of lever 188 is provided with an inwardly extending arm 192 which is pivotally mounted at 194 and is biased by means of spring 196 against a stop 198 provided on the lever. When arm 184 strikes arm 192 as the conveyor drops, lever 188 will be pivoted out of engagement with notch 40. The weight of loader 12 will result in rearward movement thereof relative to pipe 32 as the wagon 14 continues to be pulled through the field. As conveyor 68 continues to drop lever 188 will pivot forward sufficiently to permit arm 192 to pivot against the bias of spring 196 and clear the end of arm 184. This enables lever 188 to pivot by gravity backwards so that lever end 190 will be in position to engage the next successive notch in pipe 32 at the next tier. When this occurs the loader will again be secured to pipe 32 for the loading of the next eight bales.

When all tiers have been filled and the conveyor end has dropped to again actuate longitudinal indexing mechanism 42, detent mechanism 186 will again operate in the above manner to release the loader from the wagon. At this time pipe 32 will pull completely free from the loader and legs 44 will function to support the loader in an upright position. Subsequent to this another empty wagon may readily be attached to the loader to continue the bale loading operation.

What is claimed is:

1. A bale loading machine attachable to a bale carrying wagon having a bed surface and a longitudinally extending support mounted on a side of the bed, the machine comprising the combination of; a frame; wheel means supporting the frame; means to attach the frame to the support at said side of the bed for longitudinal sliding movement therewith; means to releasably hold the frame to the support at successive tier positions along the bed; elevator means on the frame to move the bales upwardly; conveyor means to move the elevated bales laterally toward the bed, the conveyor means having a vertically movable discharge end adjacent the bed; drive means to move the discharge end of the conveyor means upwardly between successive bale levels; means to power the elevator and conveyor means; other means to energize the drive means responsive to a predetermined number of bales moved toward the bed at each level, the other means further operating to de-energize the drive means upon movement of the discharge end to a next higher level; means to releasably hold the discharge end at each level; means to return the discharge end downwardly to the bottom level responsive to movement of said predetermined number of bales onto the top level; and means to release the frame from the support responsive to movement of the discharge end of the conveyor to the bottom level to initiate sliding movement of the frame to the next rearward tier position.

2. The invention as defined in claim 1 wherein the power means comprises a drive train drivingly connecting the elevator and conveyor means with the wheel means.

3. The invention as defined in claim 1 wherein the drive means comprises a toothed wheel rotatably mounted on the discharge end and engaging a vertically disposed rack; and the other means comprises a clutch on the discharge end adapted to engage and disengage the toothed wheel for rotation with the conveyor.

4. The invention as defined in claim 2 wherein the other means further comprises a plurality of pivotable cams, each cam being positioned at a respective level to disengage the clutch in a first cam position and to engage the clutch in a second cam position; additional means to releasably hold the cams in their first positions; indexing means operating responsive to said movement of the predetermined number of bales at each level to release each cam to its second position; and, reset means to pivot each cam to its first position responsive to upward movement of the discharge end from the respective level of each respective cam.

5. The invention as defined in claim 4 wherein the indexing means comprises a rotatable indexing wheel having peripheral lugs equal in number to the number of levels in each tier, each lug operating the additional means to release the respective cam at each level, and means to rotate said indexing wheel through a predetermined angle to operate the additional means responsive to said predetermined bale movement.

6. The invention as defined in claim 5 wherein the means to rotate the indexing wheel comprises a plurality of teeth on the indexing wheel equal in number to the number of bales in each tier, ratchet means engaging the teeth to rotate the indexing wheel, and lever means to actuate the ratchet means, the lever means having an arm extending into the path of bale travel through the discharge end, the arm being adapted to actuate the ratchet means responsive to bale movement.

7. The invention as defined in claim 1 wherein the means to releasably hold the discharge end comprises a plurality of stop arms, each stop arm being pivotally mounted to the frame at a respective level for movement between a first position supporting the discharge end and a second position permitting vertical movement of the discharge end, the stop arm being moved to its second position by the discharge end during upward travel thereof.

8. The invention as defined in claim 7 wherein the means to return the discharge end comprises cam means on the discharge end operating responsive to movement of said predetermined number of bales onto the top level to pivot each stop arm to its second position.

9. The invention as defined in claim 1 wherein the means to releasably hold the frame to the support comprises detent means on the frame, and a plurality of detent engaging means on the support longitudinally spaced approximately one bale width apart.

10. The invention as defined in claim 9 wherein the means to release the frame from the support comprises a projecting arm on the discharge end in registry with the detent means, the projecting arm releasing the detent means during downward movement of the discharge end, the frame sliding rearward relative to the support until the detent means holds the frame thereto at the next successive detent engaging means.

References Cited

UNITED STATES PATENTS

| 1,305,501 | 6/1919 | Steele | 214—6 X |
| 2,642,221 | 6/1953 | Offutt et al. | 214—6 X |
| 2,767,863 | 10/1956 | Botley | 214—6 |
| 2,822,659 | 2/1958 | Moore | 214—6 X |

FOREIGN PATENTS

| 933,316 | 8/1963 | Great Britain. |

HUGO O. SCHULZ, *Primary Examiner.*

R. J. SPAR, *Assistant Examiner.*